US008838969B2

(12) United States Patent
McCreight et al.

(10) Patent No.: US 8,838,969 B2
(45) Date of Patent: *Sep. 16, 2014

(54) ENTERPRISE COMPUTER INVESTIGATION SYSTEM

(71) Applicant: Guidance Software, Inc., Pasadena, CA (US)

(72) Inventors: Shawn McCreight, Pasadena, CA (US); Dominik Weber, Lake View Terrace, CA (US); Matthew Garrett, Whittier, CA (US)

(73) Assignee: Guidance Software, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,481

(22) Filed: Feb. 1, 2013

(65) Prior Publication Data

US 2013/0212389 A1     Aug. 15, 2013

Related U.S. Application Data

(63) Continuation of application No. 12/960,414, filed on Dec. 3, 2010, now Pat. No. 8,464,057, which is a continuation of application No. 10/936,466, filed on Sep. 8, 2004, now Pat. No. 7,900,044, which is a continuation of application No. 10/176,349, filed on Jun. 20, 2002, now Pat. No. 6,792,545.

(51) Int. Cl.
| | |
|---|---|
| *H04L 9/00* | (2006.01) |
| *H04L 29/06* | (2006.01) |
| *G06F 21/60* | (2013.01) |
| *G06F 21/64* | (2013.01) |

(52) U.S. Cl.
CPC *H04L 9/00* (2013.01); *H04L 63/08* (2013.01); *G06F 21/606* (2013.01); *G06F 21/64* (2013.01); *H04L 63/062* (2013.01); *H04L 63/083* (2013.01); *H04L 63/1433* (2013.01); *H04L 63/0442* (2013.01); *H04L 63/0435* (2013.01)
USPC ........................................................ 713/168

(58) Field of Classification Search
USPC .................. 713/168, 165, 167; 709/217–219; 380/278, 279, 281
See application file for complete search history.

(56) References Cited

U.S. PATENT DOCUMENTS

| | | |
|---|---|---|
| 5,475,625 A | 12/1995 | Glaschick |
| 5,491,750 A | 2/1996 | Bellare et al. |

(Continued)

OTHER PUBLICATIONS

Civie, V. Future Technologies From Trends in Computer Forensic Science, IEEE Sep. 1998; Sections II and V, pp. 105-108.

(Continued)

*Primary Examiner* — Beemnet Dada
(74) *Attorney, Agent, or Firm* — Christie, Parker & Hale, LLP

(57) ABSTRACT

A method, apparatus and system for secure forensic investigation of a target machine by a client machine over a communications network. In one aspect the method comprises establishing secure communication with a server over a communications network, establishing secure communication with the target machine over the communications network, wherein establishing secure communication with the target machine includes establishing secure communication between the server and the target machine, installing a servelet on the target machine, transmitting a secure command to the servelet over the communications network, executing the secure command in the servelet, transmitting data, by the target machine, in response to a servelet instruction, and receiving the data from the target machine over the communication network. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

14 Claims, 14 Drawing Sheets

(56) References Cited

U.S. PATENT DOCUMENTS

| | | | |
|---|---|---|---|
| 5,819,273 | A | 10/1998 | Vora et al. |
| 5,928,323 | A | 7/1999 | Gosling et al. |
| 5,944,791 | A | 8/1999 | Scherpbier |
| 5,944,794 | A | 8/1999 | Okamoto et al. |
| 6,012,098 | A | 1/2000 | Bayeh et al. |
| 6,084,969 | A | 7/2000 | Wright et al. |
| 6,292,896 | B1 | 9/2001 | Guski et al. |
| 6,377,589 | B1 | 4/2002 | Knight et al. |
| 6,601,061 | B1 | 7/2003 | Holt et al. |
| 6,647,400 | B1 | 11/2003 | Moran |
| 6,792,545 | B2 | 9/2004 | McCreight et al. |
| 6,874,088 | B1 | 3/2005 | Stevens |
| 6,889,168 | B2 | 5/2005 | Hartley et al. |
| 6,944,760 | B2 | 9/2005 | Wills |
| 7,096,503 | B1 | 8/2006 | Magdych et al. |
| 7,146,642 | B1 | 12/2006 | Magdych et al. |
| 7,370,072 | B2 | 5/2008 | Jessen |
| 2001/0011349 | A1 | 8/2001 | Garrison |
| 2002/0178162 | A1 | 11/2002 | Ulrich et al. |
| 2003/0014669 | A1 | 1/2003 | Caceres et al. |
| 2003/0172306 | A1 | 9/2003 | Cain et al. |
| 2003/0195984 | A1 | 10/2003 | Zisapel et al. |
| 2003/0196123 | A1 | 10/2003 | Rowland et al. |
| 2003/0208689 | A1 | 11/2003 | Garza |
| 2004/0006588 | A1 | 1/2004 | Jessen |
| 2004/0073534 | A1 | 4/2004 | Robson |
| 2004/0098359 | A1 | 5/2004 | Bayliss et al. |
| 2004/0122908 | A1 | 6/2004 | Konopka et al. |
| 2004/0260733 | A1 | 12/2004 | Adelstein et al. |
| 2005/0268334 | A1 | 12/2005 | Hesselink et al. |
| 2006/0101009 | A1 | 5/2006 | Weber et al. |
| 2007/0011450 | A1 | 1/2007 | McCreight et al. |
| 2007/0112783 | A1 | 5/2007 | McCreight et al. |
| 2008/0082672 | A1 | 4/2008 | Garret |

OTHER PUBLICATIONS

Abraham, et al. *Investigative Profiling with Computer Forensic Log Data and Association Rules*, IEEE 2002, pp. 11-18.

International Search Report for PCT/US2003/18063 dated Jan. 2, 2004, 6 pgs.

*Honeypot Forensic Part 1: Analyzing the Network*, IEEE Computer Society, IEEE Security & Privacy, Jul./Aug. 2004, pp. 72-78.

International Search Report and Written Opinion for PCT/US06/39527, dated Jul. 7, 2008, 8 pgs.

International Search Report and Written Opinion for PCT/US05/46421, dated Jul. 21, 2008, 11 pgs.

International Search Report and Written Opinion for PCT/US07/79870, dated Sep. 15, 2008, 8 pgs.

Supplementary European Search Report and Communication for EP03734478 dated, Sep. 22, 2008, 3 pgs.

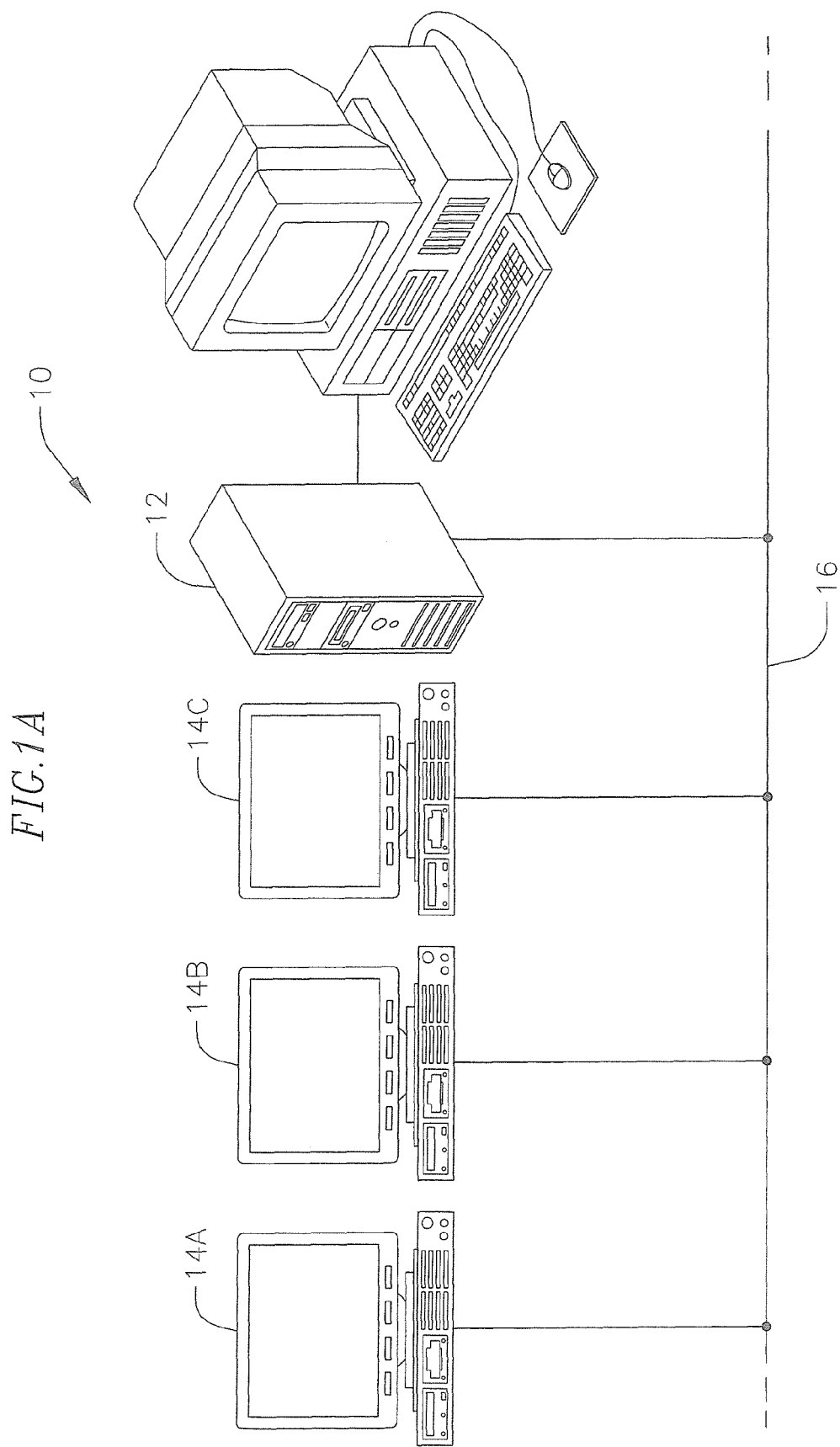

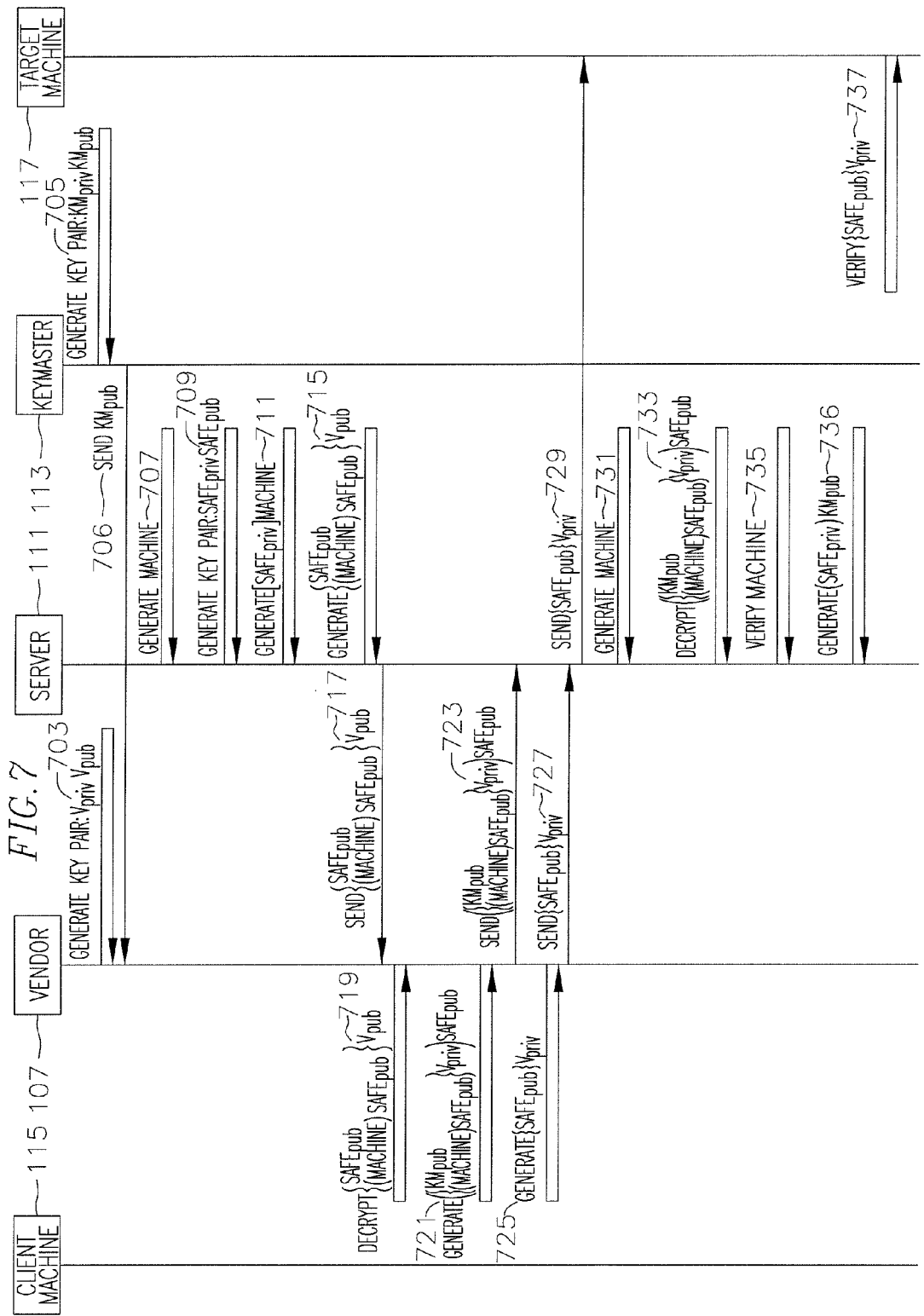

ENTERPRISE COMPUTER INVESTIGATION SYSTEM

CROSS-REFERENCE TO RELATED APPLICATIONS

This application is a continuation application of U.S. application Ser. No. 12/960,414, filed Dec. 3, 2010, which is a continuation application of U.S. Pat. No. 7,900,044, issued Mar. 1, 2011, which is a continuation of U.S. Pat. No. 6,792,545, issued Sep. 14, 2004, the entire content of all of which are incorporated herein by reference herein.

FIELD OF THE INVENTION

The present invention relates to computer investigation systems, and more specifically, to secure computer forensic investigations in a network.

BACKGROUND

Computer investigation has become increasingly important as the use of computers has extended to virtually all areas of everyday life. Computer investigation, as used herein, includes computer forensics, which is the collection, preservation and analysis of computer-related evidence. Computer-related evidence is increasingly being used for court trials and police investigations. Computer evidence may be relevant in criminal or civil matters.

One tool for computer forensic investigation is software used to perform the computer forensic investigation. Electronic evidence may be altered or erased without proper handing. For example, merely booting a target computer into its native Windows environment will alter critical date stamps, erase temporary data, and cause data to be written to a hard disk drive or other storage device, thereby possibly destroying or altering data on the storage device. It is desirable in forensic systems to be minimally invasive and prevent unintended changes of the data-on the storage device. Accordingly, it is desirable that computer forensic software minimize the alteration of data during the acquisition process and that it further minimize any such alteration by other programs.

As an example of forensic investigation, a target storage device may be non-invasively examined by creating a bit-stream image, or "exact snapshot," of the target storage device on another external media, such as floppy or zip disk, thereby creating an image or working copy of the target storage device.

Once the image copy is created, computer forensic software may mount the image of the target storage device as a read-only drive, thus allowing the investigator to conduct the examination on the image of the target drive without altering the contents of the original. This process of making a copy image of the storage device, before examining the storage device, may preserve computer files without altering date stamps or other information. The process of non-invasively examining the storage device may also be accomplished through a preview process where the computer is booted to DOS and then connected to the investigator's computer, for example, through a parallel port cable.

Computer forensic analysis software may enable the efficient management, analysis and searching of large volumes of computer data by being able to view and analyze, for example, such storage devices such as disk drives at the disk level without having to go through, for example, intermediate operating system software. Forensic analysis scripting tools may be used to target and automate analysis of large volumes of computer data. Accordingly, computer forensics analysis software may be an advantageous tool for related but non-forensic investigation purposes, such as computer auditing and information assurance.

Current computer forensics analysis tools commonly work either from an image copy of a storage device, or over a link coupled between the parallel ports of the analyzing computer and the target computer. Commonly used, non-forensic, methods of searching, reviewing, and copying logical files over a network may have a shortcoming in that time stamps and existing data may be altered or destroyed in the process.

Viewing computer files presents additional problems when used in a network setting. A remote administrator may access a node on a network and access all of the files on the node's hard drive. However, when the remote administrator opens and accesses a file, the time stamp of the file may change, and a temporary copy of the file may be created on the node's hard drive as well as link files and other data. It is desirable for forensic investigations to maintain the time stamps, and to avoid creating various temporary files, which may overwrite other data. Even though a remote administrator can commonly access files, a remote administrator may be unable to access such items as swap files, deleted files, file slack, or printer spooler files. File slack is the data located from the end of the logical file to the end of the physical storage allocation on a storage device and may contain information previously written to the storage device. Additionally, a storage device, such as a hard drive, may have dissimilar partitions, for example, fat and ext2, to operate with two different operating systems. In such a case a remote administrator may only be able to see and access the partition which corresponds to the remote administrator's operating system. Additionally, a search done by the remote administrator may be slower than a search carried out by software resident on that node. Remote access over a computer network also provides additional opportunities for abuse, such as unauthorized inspection.

Accordingly, there is a need for methods and systems for performing secure computer forensics investigations over a computer network.

SUMMARY OF THE INVENTION

An embodiment of the present invention is directed to the computer investigation of target machines connected to a network and security and authentication protocols that enable computer investigations to take place in a secure environment.

In one aspect of the present invention, a method of examining a storage device coupled to a target machine in a communications network is disclosed. The method includes installing a servelet on the target machine, commanding the servelet over the communications network to retrieve data from the storage device, using the servelet to retrieve data from the storage device,
receiving data from the servelet over the communications network, and storing the retrieved data on a client machine.

In another aspect of the present invention, a machine coupled to a storage device and coupled to a network is disclosed. The machine includes a processing unit and a servelet, the servelet including computer code that executes on the processing unit, the code comprising: code that receives a command to read a portion of the storage device, code that reads the storage device according to the command received, and code that sends data from the reading of the storage device to a client machine.

In yet another aspect of the present invention, a method for secure forensic investigation of a target machine by a client machine over a communications network is disclosed. The method includes establishing secure communication with a server over a communications network, establishing secure communication with the target machine over the communications network, wherein establishing secure communication with the target machine includes establishing secure communication between the server and the target machine, installing a servelet on the target machine, transmitting a secure command to the servelet over the communications network, executing the secure command in the servelet, transmitting data, by the target machine, in response to a servelet instruction, and receiving the data from the target machine over the communication network.

In yet another aspect of the present invention, a system for secure forensic investigation over a communication network is disclosed. The system includes a target machine coupled to the communication network, the target machine coupled to a storage device, a client machine coupled to the communications network, the client machine configured to investigate the target machine over the communications network, and an intermediate node coupled to the communications network, wherein the intermediate node is configured to facilitate secure communication between the client machine and the target machine over the communications network.

In yet another aspect of the present invention, an apparatus for secure forensic investigation of a target machine by a client machine over a communications network is disclosed. The apparatus includes means for establishing secure communication with a server over a communications network, means for establishing secure communication with the target machine over the communications network, wherein establishing secure communication with the target machine includes means for establishing secure communication between the server and the target machine, means for installing a servelet on the target machine, means for transmitting a secure command to the servelet over the communications network, means for executing the secure command in the servelet, means for transmitting data, by the target machine, in response to a servelet instruction, and means for receiving the data from the target machine over the communication network.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements throughout:

FIG. 1A is a graphical illustration of an environment in which embodiments of the present invention may operate.

FIG. 7 is a sequence diagram of a setup process for machines used in the computer investigation in accordance with an embodiment of the invention.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to better illustrate the concepts of the present invention.

Various aspects of the inventive concepts herein will be described in the context of a computer network, however, those skilled in the art will appreciate that secure computer investigation is likewise suitable for use in various other communications environments. Accordingly, any reference to a computer network is intended only to illustrate the inventive aspects of the present invention, with the understanding that such inventive aspects have a wide range of applications.

FIG. 1A is a graphical illustration of an environment in which embodiments of the present invention may operate. In FIG. 1A a computer network is shown generally at 10. FIG. 1A illustrates computer workstations 14A, 14B and 14C, which are coupled to server 12 via an Ethernet coupling 16. The network may comprise any number of workstations and servers. Additionally, the Ethernet coupling 16 may be replaced by other couplings well known in the art.

Figure 1B:
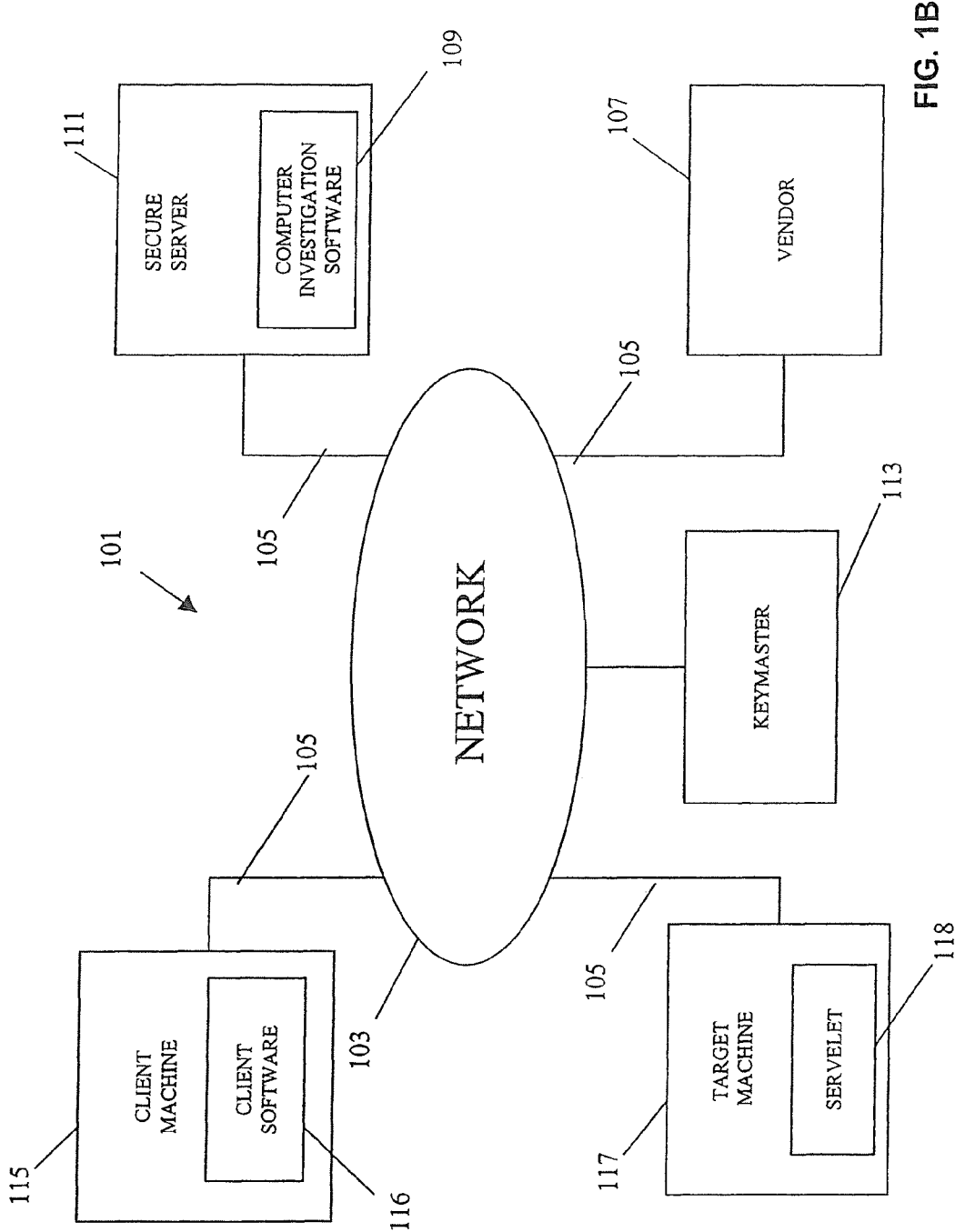
FIG. 1B is a graphical illustration of an exemplary topology for an embodiment of the present invention.

FIG. 1B is a graphic illustration of an embodiment of the invention installed on an exemplary computer network. The exemplary environment illustrated at 101 may be a computer network, such as the Internet, a wide area network (WAN), a local area net (LAN), or other network environment. For the purposes of the present disclosure a network may be defined as any communications scheme able to connect multiple machines, in addition to the traditional notion of a network. The network 103 includes a plurality of machines coupled to the network 103 over data communications links 105. The machines may be servers, work stations, personal computers, or other devices connected to the network by the data communications links 105. Link 105 may be any network link known in the art, for example, an Ethernet coupling. Vendor 107 is a provider of computer investigation software 109 that is used for the operation of a computer investigation system on network 101. Computer investigation software 109, which is used to establish a secure investigational link and to facilitate secure communication between a client machine 115 and a target machine 117, is installed by the vendor 107 on a server 111. The investigation software may be installed on any machine on the network 101, here server 111 is exemplarily chosen. The machine on which the investigation software 109 is installed is commonly located at a physically secure location, to help prevent it from being easily compromised. The computer investigation software 109 may be installed locally or over the network 103.

Keymaster 113 is commonly a trusted network administrator or other equivalently trusted individual. A client machine 115 investigates and retrieves data from the target machine 117 over the network 103. Client software 116 operates on the client machine 115. The target machine 117 is exemplarily the subject of the forensic computer investigation. A servelet 118 is installed on the target machine 117. Computer data, software objects, or data packages are sent over the network using standard communication protocols, such as TCP/IP, SOCKS, IPX/SPX, or other suitable communication protocols. Machines communicate with other machines on the network by way of the software operating on each of the machines in conjunction with hardware components of the machine.

There are exemplarily two different ways that a target machine 117 on network 103 can be investigated. The first type of investigation is a direct investigation of the target machine 117. In such an investigation the target machine 117 is examined directly. Such an examination may be accomplished, for example, by making a disk image of a hard disk on the target machine 117 or in some manner directly coupling to the target machine 117 for the purposes of investigation.

A second method of investigating a target machine 117 is to investigate the target machine 117 remotely, for example, over a network 103. Such an investigation may be assisted by remote forensic examination tools. An illustrative example of such an investigation is depicted in FIG. 2.

Figure 2:
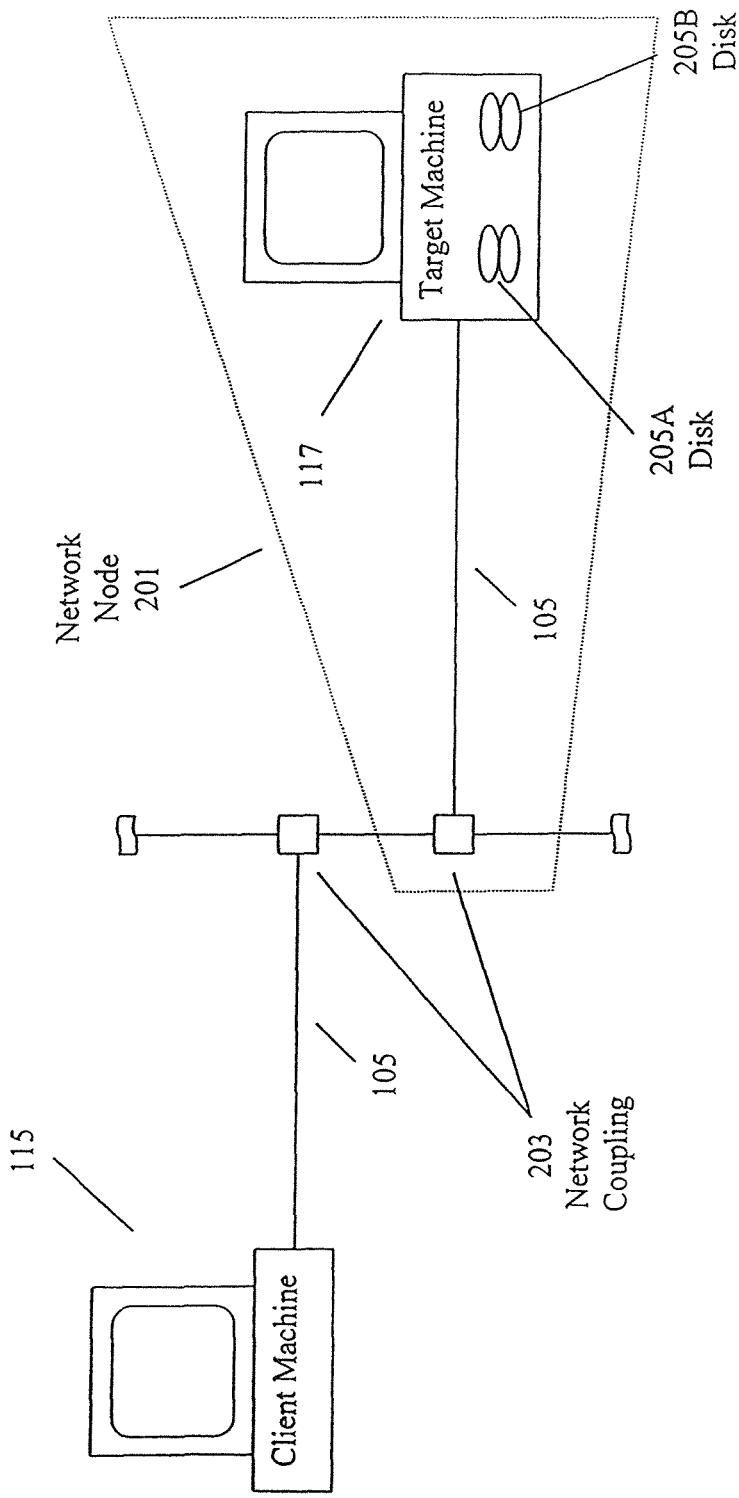
FIG. 2 is a graphic illustration depicting the examination of a target machine by a client machine over a network.

FIG. 2 is a graphic illustration depicting the examination of a target machine 117 by a client machine 115 over a network 103. Such an examination may be assisted by various embodiments of the invention which provides tools for remote forensic examinations.

In an illustrative embodiment of the invention Client machine 115 examines a network node 201. The network node 201 comprises a target machine having two hard disks, e.g. 205A and 205B. The client machine 115 may investigate the hard drives 205A and 205B on target machine 117. One method of accomplishing such examination makes use of the fact that the target machine 117 will commonly be running some type of operating system. The operating system running on target machine 117 commonly will have a file system associated with it as a part of the operating system. Accordingly, the target machine may have a file system(s) mounted on the one or more disks 205A or 205B. In some operating systems the client machine 115 can assume an administrator-type mode and get a Windows™ Explorer-type view of the file system which is mounted on target machine 117. Such a view may be obtained without the operator of the target machine 117 being aware that such a view is being obtained.

One difficulty with the use of a resident operating system for a forensic examination is that the client machine 115 will commonly operate in an administrative mode such that, as soon as the client machine 115 opens a document on the target machine 117, a time stamp on the document may change. Additionally, a temporary file and/or a swap file may be created to accompany the open document. Accordingly, such changes on the target machine 117 may not be desirable from a forensic inspection standpoint. Additionally, if disk 205A contains one operating system and disk 205B contains another file or operating system that is not recognized by the operating system of disk 205A, the client machine 115 may not be able to read both file systems. Such may be the case even if there is only one disk and the disk is partitioned for multiple operating systems. The client machine 115 may also have no visibility into files which have been deleted from the target machine. For the purposes of forensic investigation, the files that have been deleted may be of importance. An additional difficulty, which may be encountered, is in viewing file slack, as illustrated in FIG. 3.

Figure 3:
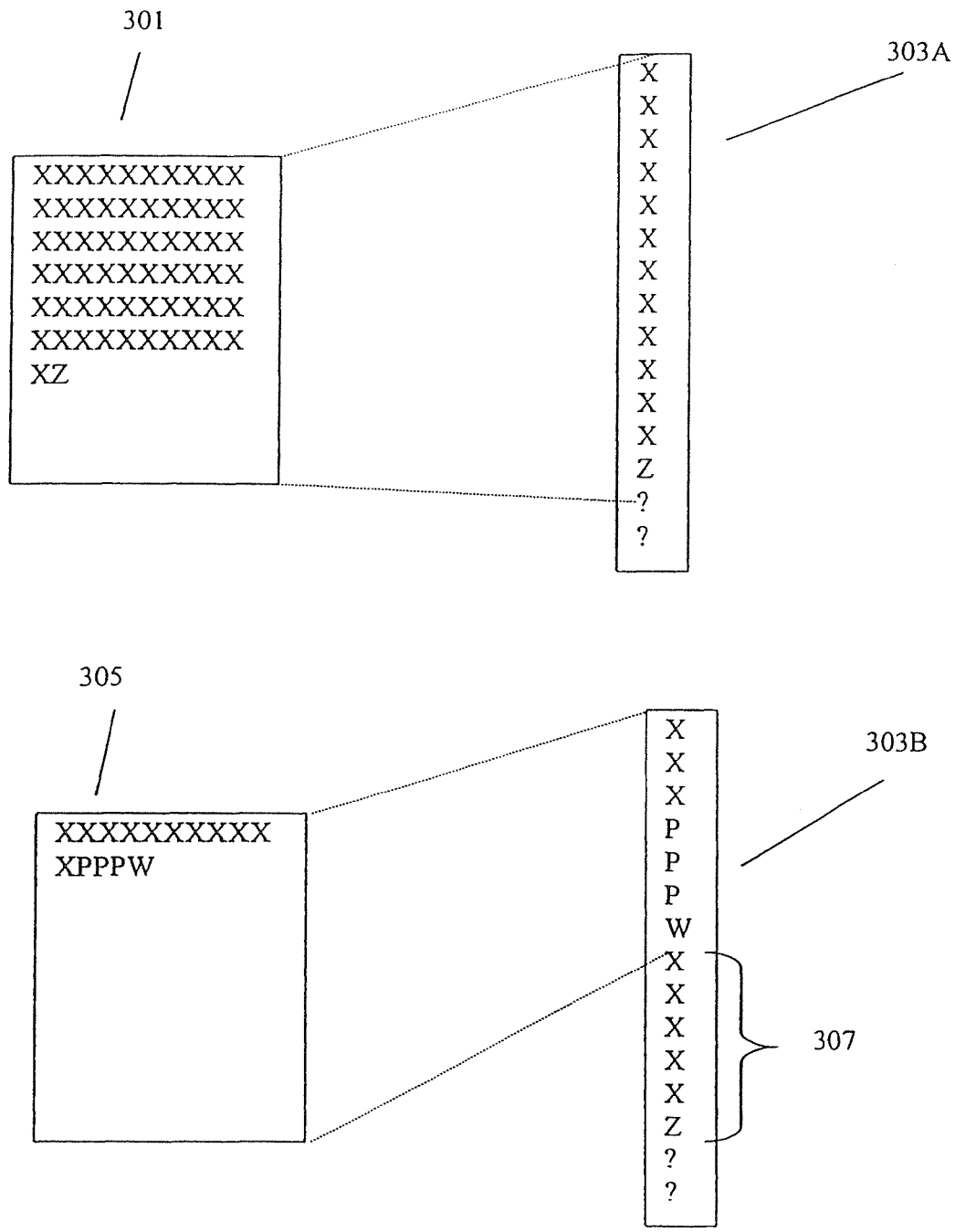
FIG. 3 is a graphic illustration of file slack that may be of interest in a forensic investigation.

FIG. 3 is a graphic illustration of file slack that may be of interest in a forensic investigation. In a Windows™ operating system, files are stored in clusters of multiples of 512 bytes. Accordingly, if a file is 513 bytes long it will occupy two clusters, as will a file that is 1,024 bites long. In the illustration in FIG. 3, a memo 301 is created. The memo 301 is then saved and mapped on to cluster 303A. At a time later the file 301 is edited to form file 305. When file 305 is mapped cluster 303 it appears as shown at 303B. In other words, the contents of file 305 is mapped on cluster 303 as shown in 303B but since the file 305 is shorter than file 301, file 305 takes up less of the 303 cluster than does file 301. Accordingly, the remnant 307 of file 301 is still present on cluster 303 as shown at 303B. The remnant of file 301 that remains in cluster 303B is called file slack and is illustrated at 307. File slack may show portions of previous files, which had been stored on the cluster before the storage of the current file. Such slack may be of great interest in computer forensic investigation, for example to see portions of previous versions of a file. File slack however may be invisible to simple file viewing utilities. Such file slack, which is defined as the area between the end of the logical file currently occupying a cluster and the actual end of the physical cluster, may contain remnants of multiple previously stored files and may contain valuable data in computer forensic investigations. Such file slack may be viewed by looking at the physical disk cluster and examining all the clusters regardless of the file size of the logical file written on them.

Figure 4:
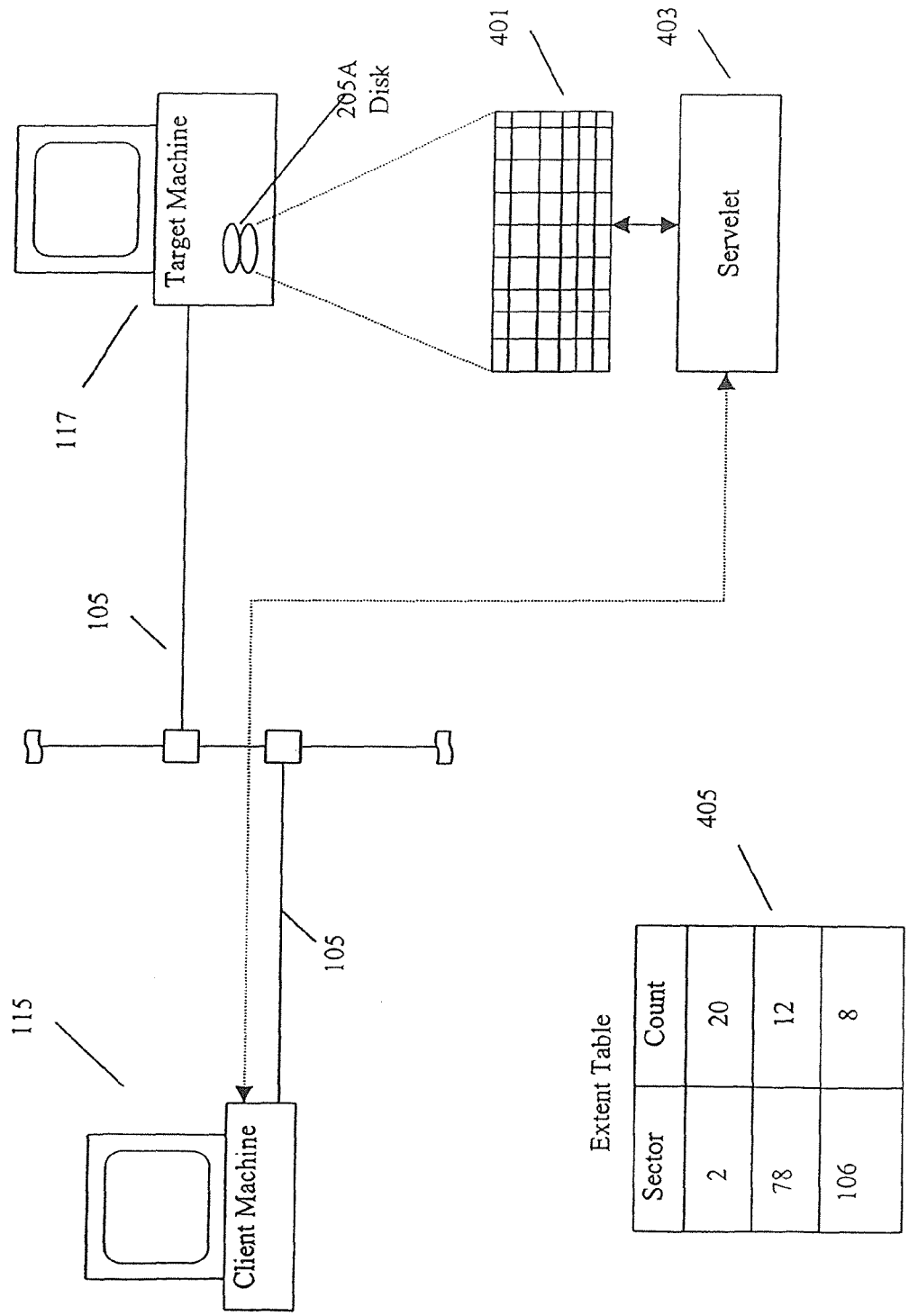
FIG. 4 is a graphic illustration of a servelet running on a target machine, according to an embodiment of the invention.

FIG. 4 is a graphic illustration of a servelet running on a target machine, according to an embodiment of the invention. In FIG. 4, the servelet 403 is running on target machine 117. In the present embodiment the servelet is limited to an ability to accept commands to read sectors from a storage device, exemplarily a physical hard drive, and report the sector data present. A sector map representing the contiguous storage on the exemplary hard disk 205A is illustrated at 401. The servelet 403, though limited to minimal capability in the present example, may be endowed with any number of capabilities, as will be readily apparent to those skilled in the art. In the present embodiment however, the servelet has limited capability, and accordingly small size. The servelet 403 uses simple disk access commands to service requests from the client machine 115. The servelet 403 is actually used to view the physical disk structures of the disk sector map 401.

Accordingly, client machine 115 can send a get sector command to servlet 403. Servlet 403 can then reply by reading the physical structure of the disk and returning the sectors requested. Commonly a client machine 115 may first command servlet 403 to read sector 0, thereby obtaining a map of the file structure of the disk 205A. Sector 0 commonly contains the partition data for the disk 205A. Once the client machine 115 has the partition data for the disk, the client machine 115 may examine logical files on the disk 205A or may examine the disk 205A according to the data written on each sector of the physical hard drive, i.e., according to the sector map 401. By comparing a logical file and its mapping on the hard disk 205A, file slack can be readily identified by the client machine 115. Such a mechanism is not limited to hard drives and may be used to examine any storage device located on the target machine 117. Additionally, the client machine 115 can determine the file structure, even of multiple operating systems, on the target machine 117. Therefore, the client machine 115 may be able to read not only the files present on disk 205A but also may be able to read such normally invisible items as deleted files, and file slack. Accordingly, by using the simple get sector command present in the servlet 403, the client machine 115 may examine all structures present on the disk 205A. In such a manner, the client machine 115 may recreate either an exact image of the physical hard drive, such as section map 401, or an equivalent file structure that exists on disk 205A, or both.

In one embodiment of the invention the client machine 115 will have mounted a series of folders and files locally which are copies of those present on the target machine 117. The client will then know the file names and the file extents. File extents are a list of the series of sectors which comprise a logical file. Accordingly, an extent table 405 may be constructed. In the exemplary extent table 405, a file begins at sector 2 and continues for 20 sectors, then jumps to sector 78 and continues for 12 sectors, then jumps to sector 106 and continues for 8 sectors. Once an extent table for a file is discerned, then searches, for example a keyword search, may be facilitated. Such a keyword search is illustrated in FIG. 5.

Figure 5:
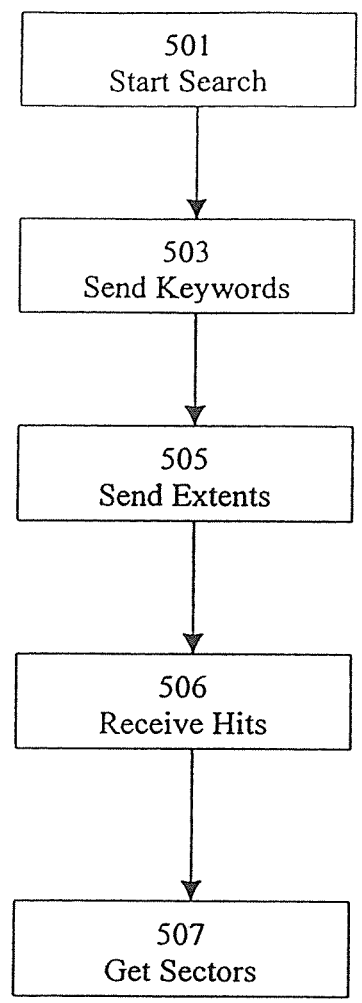
FIG. 5 is a flow diagram illustrating a keyword search according to an embodiment of the invention.

FIG. 5 is a flow diagram illustrating a keyword search according to an embodiment of the invention. In FIG. 5 the keyword search is initiated in block 501. In block 501 the file structure and extent tables for files are determined as previously described. As an example, keywords are to be searched in a file represented by extent table 405. In block 503, the keywords are sent to the servlet 403. In the present illustrative embodiment, the servlet 403 is equipped with the additional ability of being able to look for and identify keywords. In block 505 the client machine 115 then sends the file extents, according to the exemplary extent table 405, to the servlet. The client machine 115 may send all or part of the extent table depending on how the servlet software has been constructed. So if a keyword is to be searched for, in a file the servlet does not have to blindly search through the disk map 401, it may instead search the sectors and counts in the extent table. Once the servlet has completed the search, it may send back the location of the hits, i.e., matches of the keywords and where they are located in a particular sector. By doing so, the traffic across the network is minimized over a case, for example, in which sectors are simply sent from the servlet to the client machine 115. Once the hits for keyword matches are received by the client machine 115, as depicted in block 506, the client machine 115 can decide which sectors it wishes to examine and can send commands to the servlet to get sectors of the disk 205A as illustrated at block 507. By proceeding in such a manner, the amount of network traffic to and from the target machine 117 can be minimized. Additionally, much of the searching takes place right on the target machine 117, therefore speeding that process. Accordingly, the information regarding the keyword hits is only communicated to the client machine 115, instead of having to communicate the entire file to the client machine 115 and then searching for the keywords on the client 115. Using such a methodology files on the target machine can be examined and searched without having to open the file, go through an operating system, change file stamps, create backup files, or perform other actions that were required if the file would be searched using operating system utilities. In addition, file permissions on the target machine 117 can be bypassed using this methodology.

The same methodology can be used in order to take digital fingerprints of files on the target machine 117. That is, the servlet 403 may have the software to compute a digital signature for files such as, for example, a CRC (cyclic redundancy check) or other digital fingerprint well known in the art. In that way when a target machine is being examined certain files can be identified readily and can be examined for alterations. For example, certain types of hacker tools used to alter files may be used on the target machine 117. The presence of such files can be determined by having the servlet examine files for digital fingerprints of the common hacker tools. Even if such hacker tools are erased, portions of the tools may remain in deleted files or within slack space. In such a way, the types of files present on a target machine 117 can be examined. Further, types of files can be identified on the target machine 117 in order to be ignored. That is, the client machine 117 may not be interested in programs, such as word processors, spreadsheets, etc. present on the target machine 117, and can eliminate those from scrutiny by having the servlet identify their digital fingerprints, and hence their location on the storage device.

Figure 6A:
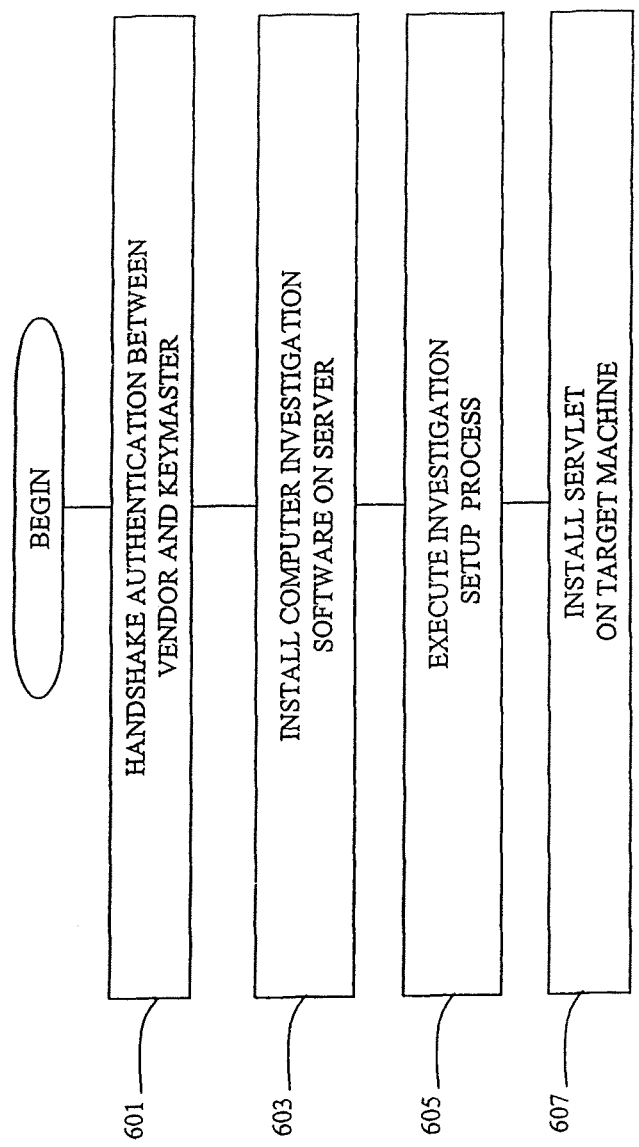
FIG. 6A is a flow diagram of a computer investigation system setup in accordance with an embodiment of the invention.

FIG. 6A is a flow diagram of a computer investigation system setup in accordance with an embodiment of the invention. In step 601, a handshake authentication occurs between the vendor 107 of the software 109 and the keymaster 113. The keymaster 113 is a trusted individual in an organization. It will commonly be an individual that is regarded as a permanent employee, because the establishment of a new keymaster commonly involves reauthorization by the forensic investigation software vendor 107. During the hand shake authentication, the vendor 107 generates an asymmetric key pair $V_{priv}$ and $V_{pub}$, comprising a private key and a public key respectively, and sends a certified copy of $V_{pub}$ to the keymaster 113. A certified copy is a copy that has been signed by a certifying authority such as Verisign. Such a certifying authority will digitally sign the vendor's key thereby authenticating the vendor's identity to the keymaster 113. The keymaster 113 generates an asymmetric key pair $KM_{priv}$ and $KM_{pub}$ and sends a copy of $KM_{pub}$ to the vendor 107. In step 603, the computer investigation software 109 is installed on the server 111. In step 605, a setup process is executed in which the server 111 and the target machine 117 are set up for secure communication. An embodiment of the setup process is further illustrated in FIG. 7. The servlet 403 is installed on the target machine 117, in step 607. Steps 601 through 607 are used to authenticate the server 111 that is used to facilitate secure investigation of the target machine 117 by the client machine 115. The server 111 may then facilitate the secure investigation of any number of target machines.

Figure 6B:
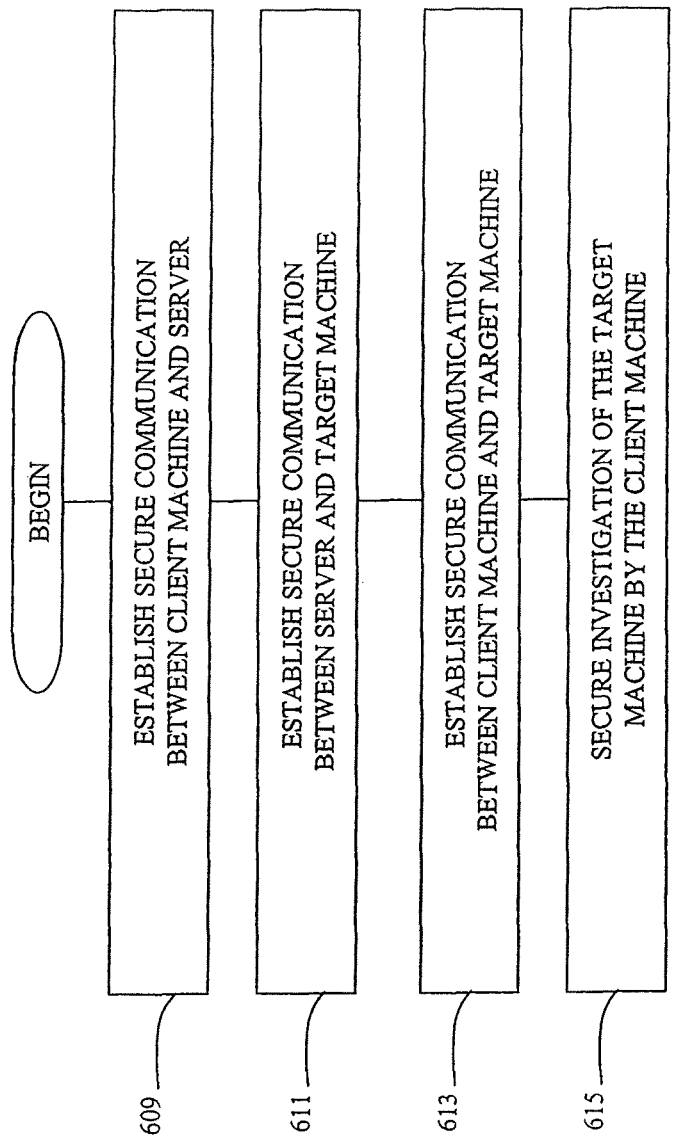
FIG. 6B is a flow diagram of a computer investigation system in accordance with an embodiment of the invention.

FIG. 6B is a flow diagram of a computer investigation system in accordance with an embodiment of the invention. In the present embodiment, a unique machine dependent number is generated on the server 111 which will be used for authenticating the communication between a client machine 115 and a target machine 117, which will be the subject of the forensic investigation. In step 609, the client machine 115 establishes secure communication with the server 111. In establishing secure communication the client machine 115 and the server 111 securely exchange a first secret encryption key to facilitate secure communication sessions between the auditor machine 115 and the target machine 117. In step 611, the server 111 and the target machine 117 securely exchange a second secret encryption key to facilitate secure communication sessions between the server 111 and the target machine 117. After the client machine 115 and the server 111 establish secure communication and the server 111 and the target machine 117 establish secure communication, the server 111 then facilitates secure communication between the client machine 115 and the target machine 117, step 613. Using the secure communication between the client machine 115 and the target machine 117, the client machine 115 performs a secure investigation of the target machine 117 over the network 103, step 615. Steps 609 through 615 may be utilized any number of times to perform secure investigation of a plurality of target machines.

Secure communications are established between the machines in the environment 101 using a combination of asymmetric public key encryption, symmetric key encryption, and digital signatures. Computer data, including software objects, tokens, and encryption keys, are transmitted and received by machines over the network 103. To distinguish between the various types of data, the following conventions are adopted herein: { } encloses signed data; ( ) encloses asymmetrically encrypted data; and [ ] encloses symmetrically encrypted data.

In public key encryption, an asymmetric key pair is created, such keys are denoted using subscript notation. For example, $KEY_{priv}$ is a private key and $KEY_{pub}$ is a public key in the key pair named KEY. Using asymmetric encryption, data encrypted with a private key and can only be decrypted by a party having the matching public key of the key pair. Similarly, data encrypted with a public key may only be decrypted by a party having the private key of the key pair. For example, the asymmetrical encryption of data named DATA by the private key $KEY_{priv}$ is denoted as $(DATA)KEY_{priv}$, where the name of the encrypted data is enclosed within the parentheses, and the key used to encrypt the data is located immediately to the right of the closing right parentheses, in this case $KEY_{priv}$.

Using symmetric key encryption, data is encrypted and decrypted with a single secret encryption key. For example, the symmetric encryption of data named DATA by the encryption key named KEY would be denoted as [DATA]KEY, where the name of the encrypted data is enclosed within square brackets, and the key used to encrypt the data is located immediately to the right of the closing right square bracket. Only the key used to encrypt the data can be used to decrypt and access the encrypted data.

Transmitted data may also be electronically signed by a party by attaching an encrypted digital certificate to the transmitted data. An encrypted digital certificate is commonly encrypted with the private key of a key pair. A party with the matching public key can decrypt the digital certificate and verify the identity of the sending party. For example, the signing of data named DATA using the encryption key $KEY_{priv}$ would be denoted as $\{DATA\}KEY_{priv}$, where the name of the data is enclosed within curly brackets, and the key used to sign the data is located immediately to the right of the closing right curly bracket. Signed data is not encrypted and is therefore readable without a key to decrypt the digital certificate. The identity of the party sending data may be determined by examining a signature attached to the data. For example, data signed with $KEY_{priv}$ may be verified by a party having $KEY_{pub}$. An encryption key is generally a large randomly generated number having certain determined properties.

Figure 6C:
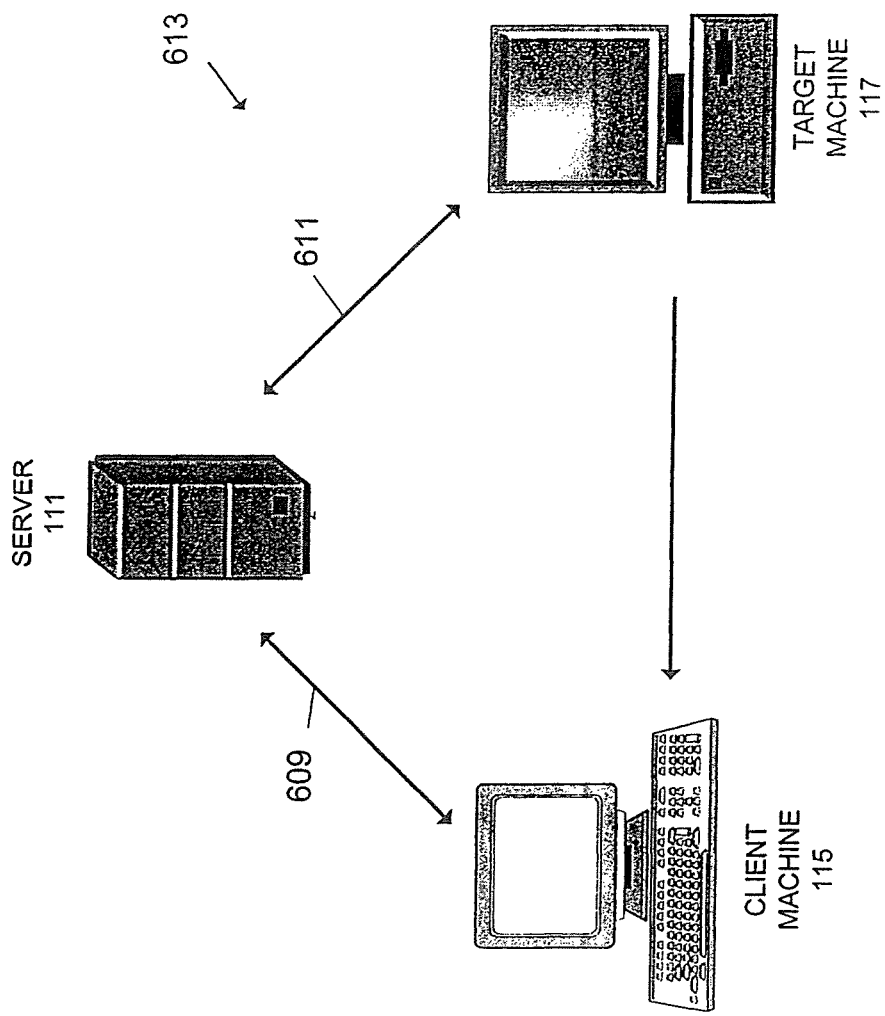
FIG. 6C is a graphical illustration of a system embodying a forensic examination security protocol, according to an embodiment of the invention
Figure 8:
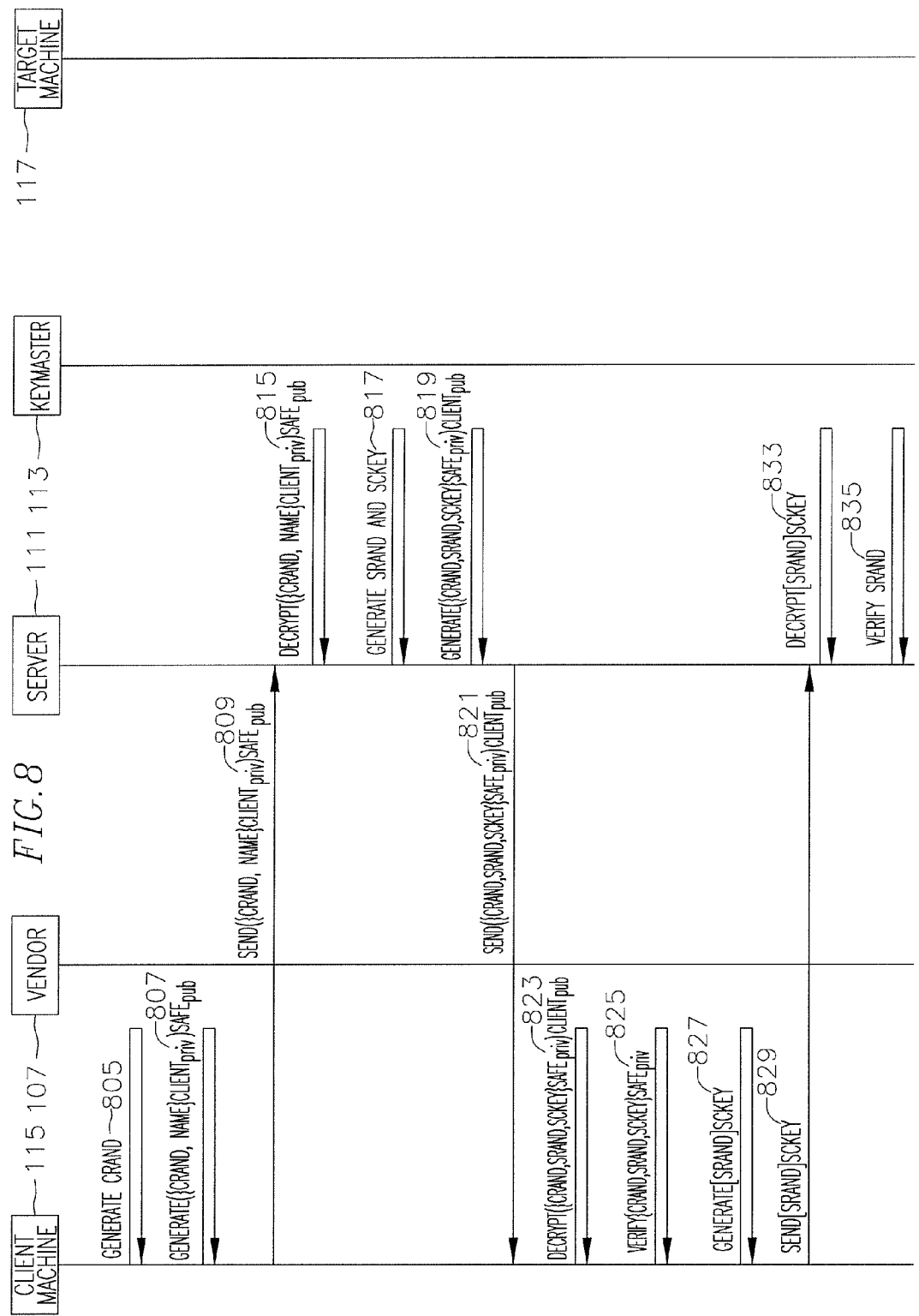
FIG. 8 is a sequence diagram for establishing a secure system of communication between an auditor machine and a server in accordance with an embodiment of the invention.
Figure 9:
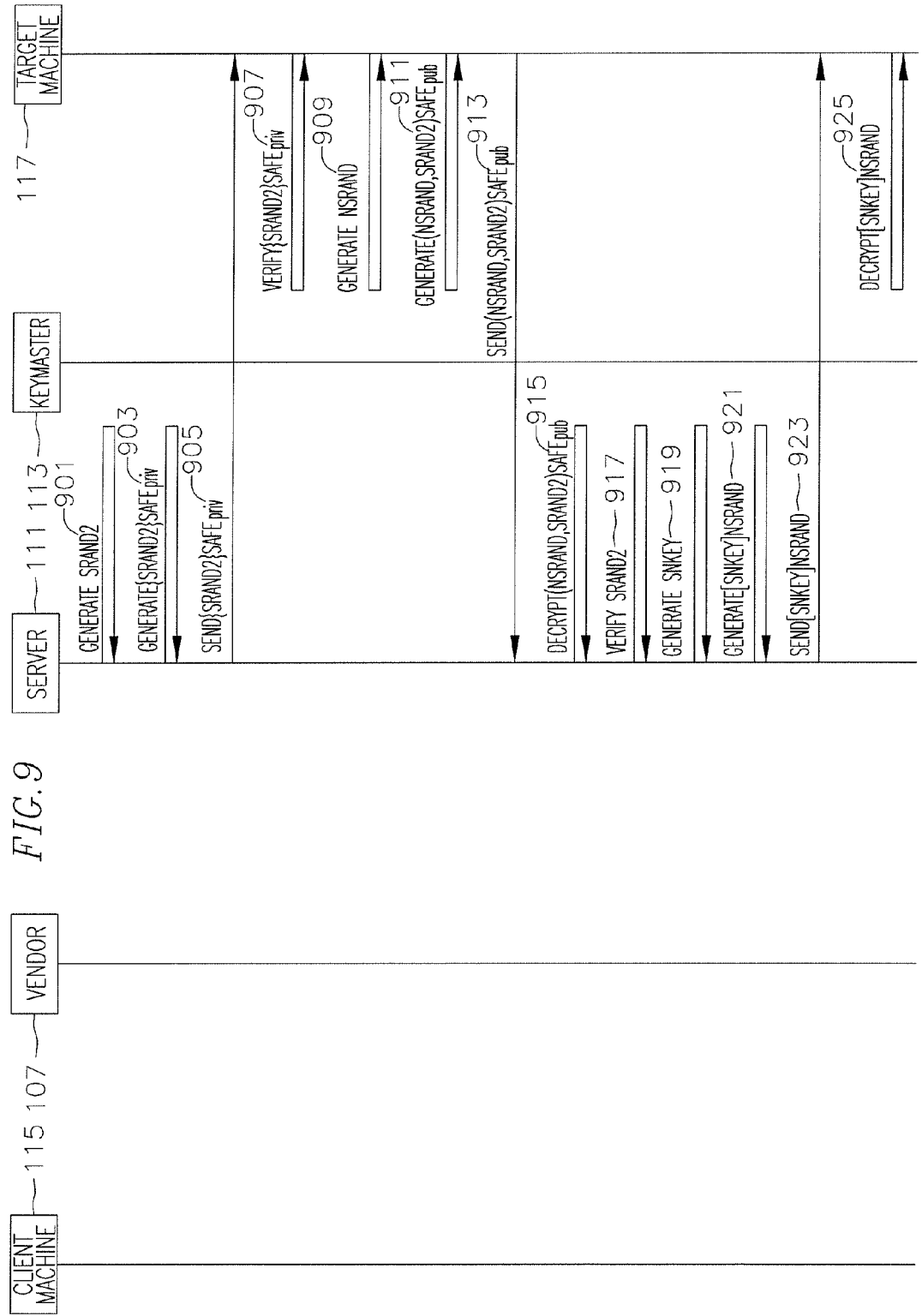
FIG. 9 is a sequence diagram for establishing a secure system of communication between the server and a target machine in accordance with an embodiment of the invention.
Figure 10:
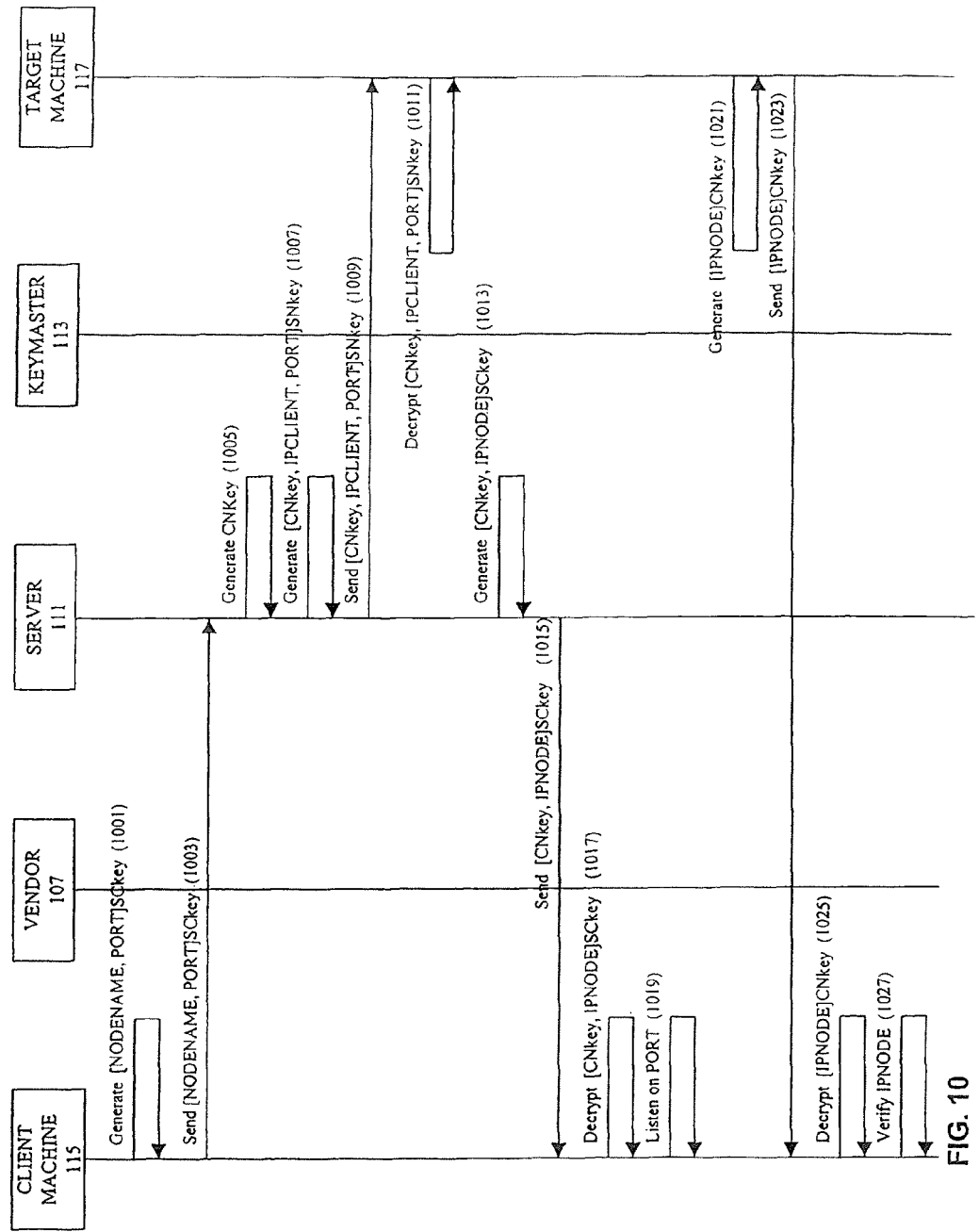
FIG. 10 is a sequence diagram for establishing a secure system of communications between an auditor machine and the target machine in accordance with an embodiment of the invention.

FIG. 6C generally depicts an overview of a system embodying a security protocol, which is further described in FIGS. 8, 9, and 10. Communication between the client 115 and server 111 is generally illustrated at 609, corresponding to block 609 in the flow chart of FIG. 6A. Communication between the server 111 and the target is generally illustrated at 613, corresponding to block 613 in the flowchart of FIG. 6A. The overall communication from client 115 to server 111 to target 117 back to client 115 is illustrated generally at 613, corresponding to clock 613 in the flowchart of FIG. 6A.

FIG. 7 is a sequence diagram of a setup process for the network machines, as illustrated in FIG. 1B, which are used for computer investigation, in accordance with an embodiment of the invention. In step 703, The vendor 107 generates a key pair $V_{priv}$ and $V_{pub}$. In step 705, the keymaster 113 generates a key pair $KM_{priv}$ and $KM_{pub}$. The keymaster 113 sends $KM_{pub}$ to the vendor 107, in step 706. In step 707, the server 111 generates MACHINE, which is a unique encryption key derived using a machine specific number. In an exemplary embodiment the size of MACHINE is 128 bits. However, MACHINE may be any suitable symmetric encryption key. In an exemplary embodiment, the machine specific number is generated by the server 111 from a hardware configuration present in the server 111, such that the same number, i.e. the machine specific number, will be produced whenever the number generation process is performed on the server 111. Steps 703 through 706 may occur any time prior to step 707. Steps 707 onward may be initiated by the server 111, which may then communicate with the vendor 107 in the course of the setup process. The server 111 generates a key pair $SAFE_{priv}$ and $SAFE_{pub}$, in step 709. SAFE is an acronym for secure authorization for forensic examination used by Guidance Software of Pasadena, Calif. herein it denotes the secure mode upon which the computer investigation software 109 runs. In step 711, The server 111 encrypts $SAFE_{priv}$ with MACHINE and generates $[SAFE_{priv}]MACHINE$. As described above, the name $[SAFE_{priv}]MACHINE$ indicates that the data enclosed in square brackets, in this case the encryption key $SAFE_{priv}$, has been symmetrically encrypted using MACHINE. $[SAFE_{priv}]MACHINE$ is saved on the server 111 where it can be accessed by the server 111. The server 111 can generate MACHINE and decrypt $[SAFE_{priv}]MACHINE$ to access and use the private key $SAFE_{priv}$. Accordingly, $SAFE_{priv}$ would be unrecoverable if the server 111 were destroyed or disabled. In the event of such an event, a copy of $SAFE_{priv}$ is archived in a secure manner for use in a recovery process. In step 715: the server 111 generates $(MACHINE)SAFE_{pub}$ by asymmetrically encrypting MACHINE with $SAFE_{pub}$; and $SAFE_{pub}$ and $(MACHINE)SAFE_{pub}$ are packaged together and encrypted by the server 111 with $V_{pub}$ to generate $$\left( \begin{array}{c} SAFE_{pub} \\ (MACHINE)SAFE_{pub} \end{array} \right) V_{pub}.$$

The server 111 sends $$\left( \begin{array}{c} SAFE_{pub} \\ (MACHINE)SAFE_{pub} \end{array} \right) V_{pub}$$

to the vendor 107 in step 717. The vendor 107 uses the private key $V_{priv}$ to decrypt $$\left( \begin{array}{c} SAFE_{pub} \\ (MACHINE)SAFE_{pub} \end{array} \right) V_{pub}$$

and obtain $SAFE_{pub}$ and $(MACHINE)SAFE_{pub}$ in step 719. The vendor 107 is unable to access MACHINE because the vendor 107 does not have $SAFE_{priv}$, the private key. The vendor 107, however, may copy the data (MACHINE) $SAFE_{pub}$. In step 721: the vendor 107 packages $KM_{pub}$ and $(MACHINE)SAFE_{pub}$ together and signs the package with $V_{priv}$ to generate $$\left\{ \begin{array}{l} KM_{pub} \\ (MACHINE)SAFE_{pub} \end{array} \right\} V_{priv};$$

and the vendor 107 encrypts $$\left\{ \begin{array}{l} KM_{pub} \\ (MACHINE)SAFE_{pub} \end{array} \right\} V_{priv}$$

with $SAFE_{pub}$ to generate $$\left( \left\{ \begin{array}{l} KM_{pub} \\ (MACHINE)SAFE_{pub} \end{array} \right\} V_{priv} \right) SAFE_{pub}.$$

The vendor 107 sends $$\left( \left\{ \begin{array}{l} KM_{pub} \\ (MACHINE)SAFE_{pub} \end{array} \right\} V_{priv} \right) SAFE_{pub}$$

to the server 111 in step 723. The vendor 107 signs $SAFE_{pub}$ with $V_{priv}$ to generate $\{SAFE_{pub}\}V_{priv}$ in step 725. In step 727, the vendor 107 sends $\{SAFE_{pub}\}V_{priv}$ to the server 111. In step 729, the server 111 may distribute $\{SAFE_{pub}\}V_{priv}$ and send $\{SAFE_{pub}\}V_{priv}$ to the target machine 117. In step 731, the server 111 generates the number MACHINE. The server 111 uses MACHINE to decrypt the archived data $[SAFE_{priv}]$MACHINE and access $SAFE_{priv}$. In step 733: the server 111 decrypts $$\left( \left\{ \begin{array}{l} KM_{pub} \\ (MACHINE)SAFE_{pub} \end{array} \right\} V_{priv} \right) SAFE_{pub}$$

using $SAFE_{priv}$, thereby accessing $$\left\{ \begin{array}{l} KM_{pub} \\ (MACHINE)SAFE_{pub} \end{array} \right\} V_{priv};$$

the server 111 verifies the contents of $$\left\{ \begin{array}{l} KM_{pub} \\ (MACHINE)SAFE_{pub} \end{array} \right\} V_{priv}$$

using public key $V_{pub}$; and the server 111 decrypts $(MACHINE)SAFE_{pub}$ using $SAFE_{priv}$ to access MACHINE. In step 735, the server 111 verifies the decrypted number MACHINE against the number MACHINE generated on the server 111 to verify that the communication with the vendor 107 has been made without being spoofed by a third party. The server 111 then has the public key $KM_{pub}$, which was sent by the vendor 107. In step 736, the server 111 encrypts $SAFE_{priv}$ with $KM_{pub}$ to generate $(SAFE_{priv})KM_{pub}$. $(SAFE_{priv})KM_{pub}$ may be archived onto a remote data storage device separate from the server 111 as part of a disaster recovery measure. Such a remote storage location may be a separate server, personal computer, disk, or other storage device. In the event of such a destruction or disabling of the server 111, the archived copy of $(SAFE_{priv})KM_{pub}$ may be accessed only by the keymaster 113 with $KM_{priv}$ to recover $SAFE_{priv}$. By asymmetrically encrypting $SAFE_{priv}$ with the keymaster's public key, $KM_{pub}$, only the keymaster 113 using the associated private key, $KM_{priv}$, can decrypt the data and access $SAFE_{priv}$. After the setup process of FIG. 7, $SAFE_{priv}$ need not be maintained on the server 111. The target machine 117 verifies the signature of $\{SAFE_{pub}\}V_{priv}$ by the vendor 107 in step 737, and has the public key $SAFE_{pub}$.

In an exemplary recovery process, the server 111 is unavailable for use and a setup process is performed on a second server. In order to avoid generating a new asymmetric server key pair and repeating the computer investigation setup, authentication, and communication processes, it is desirable to retrieve and use the archived copy of $SAFE_{priv}$. The second server retrieves the archived copy of $(SAFE_{priv})KM_{pub}$, for example, from an archive floppy, drive, or other archival storage. The second server receives $KM_{priv}$ from the keymaster 113, or otherwise has $(SAFE_{priv})KM_{pub}$ decrypted by the keymaster 113. Having obtained access to $SAFE_{priv}$, authentication of the second server is performed using steps similar to steps 711 through 736 using the second server. Since the second server is a different machine than the server 111, the second server generates MACHINE2, which is different from MACHINE. MACHINE2 is a second unique encryption key derived using a second machine specific number. MACHINE2 may be used in a similar manner as described in connection with FIG. 7, such as securely storing $SAFE_{priv}$ on the second server. One purpose of performing these steps using the second server is to authenticate the second server to the vendor to help prevent unauthorized parties from using the computer investigation software.

FIG. 8 is a sequence diagram for establishing secure communication between the client machine 115 and the server 111 in accordance with an embodiment of the invention. In step 805, the client machine 115 generates a random number Crand. In an exemplary embodiment, Crand is a 128 bit number. In step 807: the client machine 115 packages Crand and NAME and signs the package with $CLIENT_{priv}$ to create $\{Crand, NAME\}CLIENT_{priv}$; and the client machine 115 encrypts $\{Crand, NAME\}CLIENT_{priv}$ with $SAFE_{pub}$ to generate $(\{Crand, NAME\}CLIENT_{priv}) SAFE_{pub}$. In step 809, the client machine 115 sends $(\{Crand, NAME\} CLIENT_{priv}) SAFE_{pub}$ to the server 111. The server 111 verifies the identity of the client machine 115. The server 111 decrypts $(\{Crand, NAME\}CLIENT_{priv})SAFE_{pub}$ with $SAFE_{priv}$ in step 815. The server 111 uses NAME to look up the sender's public key and verify the signature of $\{Crand, NAME\}CLIENT_{priv}$. In this example sequence, NAME would include the identity of the client machine 115, and the server 111 would look up the public key of the client machine 115, $CLIENT_{pub}$, in a public key directory. The server 111 generates two additional random numbers, Srand and SCkey as illustrated in step 817. In step 819: the server 111 packages Crand, Srand, and SCkey and signs the package with $SAFE_{priv}$; and the server 111 generates $(\{Crand, Srand, SCkey\}SAFE_{priv})CLIENT_{pub}$ by encrypting the signed package with $CLIENT_{pub}$. Therefore, only the client machine 115, having the private key CLIENT$_{priv}$, will be able to decrypt ({Crand, Srand, SCkey}SAFE$_{priv}$)CLIENT$_{pub}$. The server 111 sends ({Crand, Srand, SCkey}SAFE$_{priv}$)CLIENT$_{pub}$ 821 to the client machine 115. The client machine 115 decrypts ({Crand, Srand, SCkey}SAFE$_{priv}$)CLIENT$_{pub}$ using CLIENT$_{priv}$ in step 823. The client machine 115 verifies the signature of {Crand, Srand, SCkey}SAFE$_{priv}$ in step 825 using the public key SAFE$_{pub}$ and also verifies that Crand is the same random number that the client machine 115 generated in step 805. The client machine 115 symmetrically encrypts Srand with the session key SCkey, that was generated by the server 111 at 817, to generate [Srand]SCkey in step 827. The client machine 115 sends [Srand]SCkey to the server 111 in step 829. In step 833, the server 111 uses SCkey to decrypt [Srand]SCkey and access Srand. In step 835, the server 111 verifies that the random number Srand is the same number that the server 111 generated and sent to the client machine 115 in steps 817 and 821. Verification of Srand helps to ensure that the communication has not been spoofed by a third party and also helps to verify that the communication between the client machine 115 and the server 111 is timely. Timeliness of all communications in the computer investigation system may be determined using timeouts. An expected response will not be accepted as valid if it is not received in a predetermined amount of time. One purpose of the communication between the client machine 115 and the server 111 is to authenticate the client machine 115 to the server 111 and to authenticate the server 111 to the client machine 115, thereby verifying the identities of the two parties which are communicating. Another purpose of the communication between the client machine 115 and the server 111 is to securely exchange symmetric key SCkey that can be used for secure communication as a session key. The client machine 115 and the server 111 both now have the shared, secret encryption key SCkey to use in sending symmetrically encrypted messages.

The process illustrated in FIG. 8 may be conducted between the server 111 and any number of client machines. In one embodiment of the invention, the keymaster 113 is a first client who is authenticated with the server 111. In the case of the first client authentication with the server, the asymmetric key pair CLIENT$_{priv}$ and CLIENT$_{pub}$ is synonymous with the asymmetric key pair KM$_{priv}$ and KM$_{pub}$. In the computer investigation system setup of FIG. 7, KM$_{pub}$ is securely sent to the server 111. Therefore, the server 111 may decrypt data that is encrypted with KM$_{priv}$. Accordingly, the process illustrated in FIG. 8 may be used between the keymaster 113 and the server 111 to establish a secure method of communication between the keymaster 113 and the server 111. Thereafter, other users may generate additional asymmetric key pairs which may be used by their client machines to establish secure communication with the server 111. In an exemplary embodiment, the keymaster 113 sends the user's public key to the server 111 while the user keeps the associated private key on the client machine, which may use the associated private key to perform the communication process illustrated in FIG. 8. Accordingly, after the keymaster 113 has established secure communication with the server 111, the keymaster 113 may provide for any number of client machines to communicate with the server 111.

FIG. 9 is a sequence diagram for establishing a secure system of communication between the server 111 and the target machine 117 in accordance with an embodiment of the invention. The server 111 generates a second random number Srand2 in step 901. The server 111 signs Srand2 with SAFE$_{priv}$ to generate {Srand2}SAFE$_{priv}$ in step 903. The server 111 sends {Srand2} SAFE$_{priv}$ 905 to the target machine 729 in step 905. From the sequence described in FIG. 7, the target machine 117 receives {SAFE$_{pub}$}V$_{priv}$ from the vendor 107 signed with the vendor's private key V$_{priv}$. Therefore, the target machine 117 has the public key SAFE$_{pub}$ with some assurance that a communication signed with the matching private key SAFE$_{priv}$ has been authorized by the vendor 107. The target machine 117 uses SAFE$_{pub}$ to verify the signature of {Srand2}SAFE$_{priv}$ in step 907. The target machine 117 generates a random number NSrand in step 909. The target machine 117 packages NSrand and Srand2 together and encrypts the packaged data with SAFE$_{pub}$ to generate (NSrand, Srand2)SAFE$_{pub}$ in step 911. The target machine 117 sends (NSrand, Srand2)SAFE$_{pub}$ to the server 111 in step 913. The server 111 uses SAFE$_{priv}$ to decrypt (NSrand, Srand2)SAFE$_{pub}$ in step 915. The server 111, in step 917, verifies that the number Srand2 is the same random number that the server 111 generated and sent to the target machine 117 in steps 903 and 905. The server 111 generates another random number SNkey 919. The server 111 symmetrically encrypts SNkey with NSkey to generate [SNkey]NSkey in step 921. The server 111 sends [SNkey]NSkey to the target machine 117 in step 923. The target machine 117 uses NSkey to decrypt [SNkey]NSkey and access Snkey in step 925. The server 111 and the target machine 117 both now have the shared, secret encryption key SNkey to use in sending symmetrically encrypted messages.

The security of symmetric key encryption is directly related to the quality of the random number generator used to generate a symmetric encryption key. Therefore, in the above sequence, symmetric key SNkey is generated by the server 111 and securely sent to the target machine 117. It is difficult to guarantee the quality of the random number generated at the target machine 117. Therefore, the random number generated by the target machine 117 at step 909 is used for only one communication with the server 111 to decrease the possibility that a communication encrypted with NSrand, the random number generated by the target machine 117, may be intercepted by a third party. The server 111 requests communication with the target machine 117 at the request of the client machine 115.

FIG. 10 is a sequence diagram for establishing a secure system of communication between the client machine 115 and the target machine 117, in accordance with an embodiment of the invention. The client machine 115 packages NODENAME and PORT and symmetrically encrypts the packaged data with the session key SCkey to generate [NODENAME, PORT]SCkey in step 1001. NODENAME is the IP address or other identification of the target machine 117. PORT is the identification of a port that the client machine 115 will use to communicate with the target machine 117. The client machine 115 sends [NODENAME, PORT]SCkey to the server 111 in step 1003. The server 111 generates a session key CNkey in step 1005. The server 111 packages the CNkey, IPCLIENT, and PORT and encrypts the packaged data with the SNkey to generate [CNkey, IPCLIENT, PORT]SNkey in step 1007. IP CLIENT is an IP address of the client machine 115. The server 111 sends [CNkey, IPCLIENT, PORT]SNkey to the target machine 117 in step 1009. The target machine 117 uses SNkey to decrypt [CNkey, IPCLIENT, PORT]SNkey in step 1011. The server 111 packages CNkey and IPNODE and encrypts the packaged data with the session key SCkey to generate [CNkey, IPNODE]SCkey in step 1013. IPNODE is an IP address of the target machine 117. The server 111 sends [CNkey, IPNODE]SCkey 1015 to the client machine 115. The client machine 115 uses SCkey to decrypt [CNkey, IPNODE]SCkey in step 1017 and access CNKey and IPNODE. The client machine 115 listens on PORT and waits for a communication from the target machine 117 in step 1019. The target machine 117 symmetrically encrypts IPNODE with the session key CNkey to generate [IPNODE]CNkey in step 1021. The target machine 117 sends [IPNODE]CNkey to the client machine 115 in step 1023. The client machine 115 uses CNkey to decrypt [IPNODE]CNkey to access IPNODE in step 1025. In step 1027, the client machine 115 verifies that the address IPNODE received from the target machine 117 matches the address IPNODE received from the server 111 in step 1015. The above sequence provides both the client machine 115 and the target machine 117 with a session key SCkey that was generated by the server 111. The client machine 115 and the target machine 117 can communicate with symmetrically encrypted messages using the session key CNkey.

Figure 11:
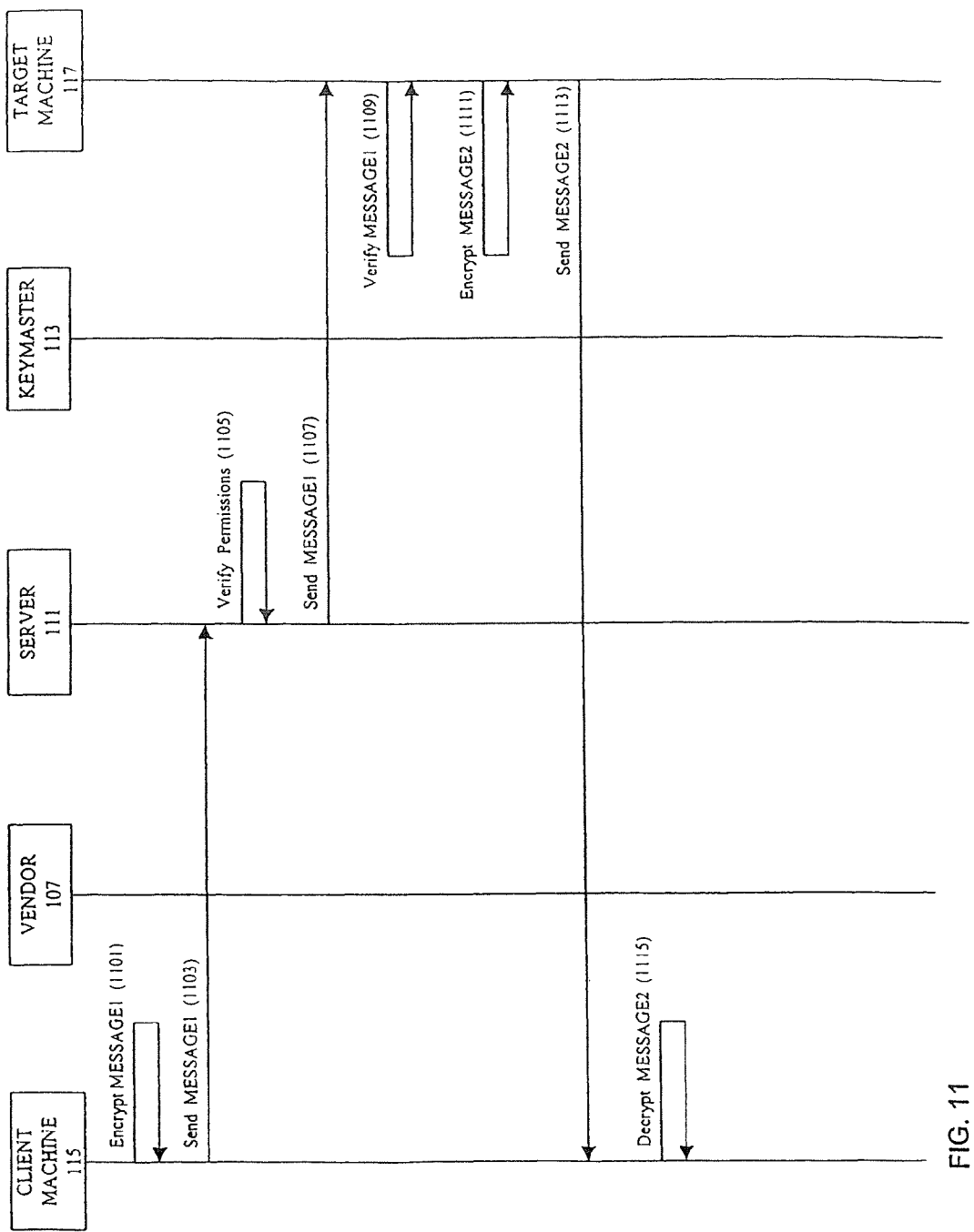
FIG. 11 is a sequence diagram for secure communication between the auditor machine and the target machine in accordance with an embodiment of the invention.

FIG. 11 is a sequence diagram for secure communication between the client machine 115 and the target machine 117 in accordance with an embodiment of the invention. The client machine 115 encrypts a message for the target machine 117 using CNkey in step 1101. The client machine 115 sends the encrypted message to the server 111 in step 1103. The server 111 verifies the permissions of the client machine 115 in step 1105. The server 111 continually oversees the communication between the client machine 115 and the target machine 117. Messages from the client machine 115 to the target machine 117 are sent through the server 111 to ensure that the client machine 115 has permission to take the requested action. The server 111 may also check and log any suspicious activity, such as failed log-on attempts by the client machine 115, unauthorized action taken, time spent accessing the target machine 117, and any other activity taken by the client machine 115 in communication with the target machine 117. In step 1107, the server 111 sends the encrypted message to the target machine 117. In step 1109, the target machine 117 verifies the message sent by the client machine 115 through the server 111 by decrypting the message with the session key CNkey. In step 1111, the target machine 117 encrypts a second message for transmission to the client machine 115. In step 1113, the target machine 117 sends the second message to the client machine 115. In step 1115, the client machine 115 verifies the second message sent by the target machine 117 by decrypting the second message with the session key CNkey.

Those skilled in the art will appreciate that the above investigation system may be implemented in a variety of configurations. For example, the secure systems of communication are not restricted to those communications among a server, target machine, and client machine, but may be implemented between multiple machines performing any variety of functions. Additionally, it will be apparent to those of ordinary skill in the art that the network may include multiple target machines and the client machine may simultaneously investigate multiple machines on a network by implementing the above investigation system in parallel operation.

In an exemplary embodiment of the invention, an investigation program uses the computer investigation system to perform the investigation of the target machine 117. The investigation program executes routines or computer operations that may be written using a programming language, scripting language, macro language, or other executable instructions. The investigation program may be executed on the client machine 115 which in turn performs executed operations on the target machine 117. Using executable routines, the investigation provides for specific, complex, and efficient searches to be performed on the target machine while minimizing or eliminating damage to the target machine being searched.

In one embodiment, the investigation program helps to prevent any data on the target machine from being altered or changed by controlling the types of routines that may be performed. For example, the investigation program may be programmed not to execute a routine that would change data important in the computer investigation. The investigation program may perform any operations supported by the particular routines being used. For example, the investigation program may view files on the target drive, copy and acquire date from the target drive, perform text searches, perform hash value searches, establish hash categories for use in searching, perform file signature searches, create compressed copies of the target drive, search file extensions, search file paths, search time stamps, search the registry, search compressed files, decompress and decode files, search using grep (generalized regular expression parser) commands, and the like.

The previous description of the exemplary embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wide area network including a server, client device, and target device, a method for remotely conducting forensic investigations of the target device over the wide area network, the method comprising:
   establishing secure communication between the client device and the target device over the wide area network in response to data provided by the server, wherein the target device runs a servlet installed on the target device;
   invoking the servlet by the client device to obtain, over the wide area network, a list of target files stored in the target device;
   generating and encrypting by the client device an investigation command for investigating the target files, wherein the investigation command includes a search key;
   transmitting the encrypted investigation command to the target device over the wide area network;
   generating and encrypting by the servlet running in the target device an output responsive to the investigation command, wherein the output generated by the servlet includes information on matches of the search key found upon searching, by the servlet, the target files; and
   transmitting the encrypted output by the target device to the client device via the secure communication established between the client device and the target device, wherein the transmitting of the encrypted output by the target device to the client device bypasses the server.

2. The method of claim 1 further comprising:
   authenticating the client device by the server; and
   establishing secure communication between the server and the client device over the wide area network.

3. The method of claim 2 further comprising:
   establishing secure communication between the server and the target device over the wide area network.

4. The method of claim 1, wherein the target files are searched without changing file stamps.

5. The method of claim 1, wherein the target files are searched without using operating system utilities of the target device.

6. The method of claim 1 further comprising:
storing by the client device into a storage device coupled to the client device, information on the matches of the search key provided by the target device.

7. The method of claim 1 further comprising:
obtaining by the client device, over the wide area network, content of one or more of the target files stored by the target device in response to the information on the matches of the search key provided by the target device.

8. A system for remotely conducting forensic investigations of a target device over a wide area network, the system comprising:
a processor; and
a memory coupled to the processor storing program instructions that, when executed by the processor, cause the processor to:
establish secure communication with the target device over the wide area network in response to data provided by a server, wherein the target device runs a servelet installed on the target device;
invoke the servelet to obtain, over the wide area network, a list of target files stored in the target device;
generate and encrypt an investigation command for investigating the target files, wherein the investigation command includes a search key;
transmit the encrypted investigation command to the target device over the wide area network;
receive from the target device via the secure communication established with the target device, output encrypted by the servelet in response to the investigation command, the output including information on matches of the search key found upon searching, by the servelet, the target files, wherein the output transmitted by the target device bypasses the server.

9. The system of claim 8, wherein the instructions further cause the processor to:
establish secure communication with the server over the wide area network.

10. The system of claim 9, wherein the server is configured to establish secure communication with the target device over the wide area network.

11. The system of claim 8, wherein the target files are searched without changing file stamps.

12. The system of claim 8, wherein the target files are searched without using operating system utilities of the target device.

13. The system of claim 8 further comprising:
a storage device coupled to the processor, wherein the storage device stores information on the matches of the search key provided by the target device.

14. The system of claim 8, wherein the instructions further cause the processor to:
obtain over the wide area network content of one or more of the target files stored by the target device in response to the information on the matches of the search key provided by the target device.

* * * * *